Dec. 18, 1956

J. R. EICHNA 2,774,726

APPARATUS FOR THE RECOVERY OF OIL AND GASEOUS PRODUCTS FROM SHALE

Filed Aug. 22, 1950

Inventor
JAMES R. EICHNA.
By E. Francis Wentworth Jr.
Attorney

Dec. 18, 1956  J. R. EICHNA  2,774,726
APPARATUS FOR THE RECOVERY OF OIL AND
GASEOUS PRODUCTS FROM SHALE
Filed Aug. 22, 1950  3 Sheets-Sheet 3
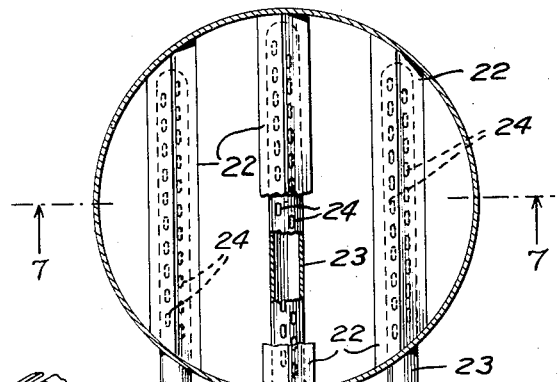
Fig. 5.
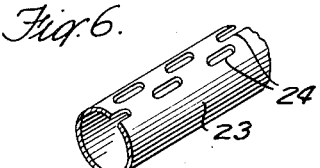
Fig. 6.
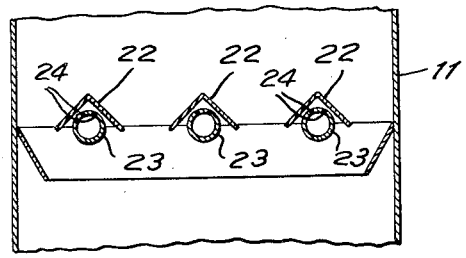
Fig. 7.
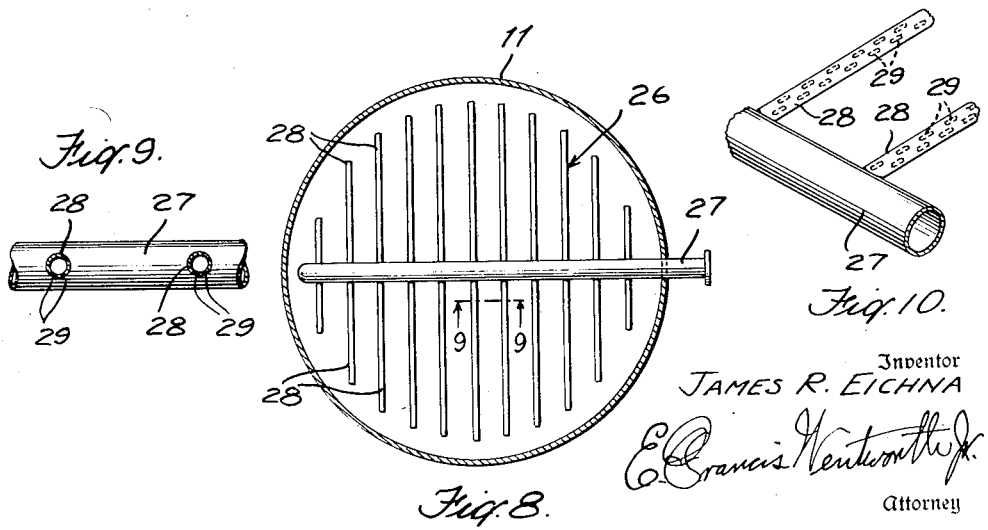
Fig. 9.
Fig. 8.
Fig. 10.
Inventor
JAMES R. EICHNA
Attorney United States Patent Office 2,774,726
Patented Dec. 18, 1956

2,774,726

APPARATUS FOR THE RECOVERY OF OIL AND GASEOUS PRODUCTS FROM SHALE

James R. Eichna, Cedar Grove, N. J., assignor to Foster Wheeler Corporation, New York, N. Y., a corporation of New York Application August 22, 1950, Serial No. 180,768

8 Claims. (Cl. 202—93)

This invention relates to a method and apparatus for the recovery of oil and gaseous products from shale.

Numerous retorting systems have been developed in various parts of the world for the recovery of oil and other products from shale, each system depending to a large extent upon the nature of the shale at the locale where treated. In the arrangement of the present method and apparatus unique retorting apparatus and method have bene invented having as objects and features, higher recovery efficiency, lower cost and simplicity of construction.

In the recovery of desirable products from shale, the retort system embodied in the present invention involves the treatment of shale in a novel retort tower wherein raw shale is admitted periodically at the top of the retort and thereafter passes downwardly in a continuous manner to the bottom of the retort tower. During the continuous downward passage of the shale in the tower, it passes first through a drying and preheating section wherein it is dried and preheated by a stream of upwardly flowing gases. Thereafter the dried and preheated shale passes successively downwardly in a second section of the retort tower through a distillation or retorting zone and, then through a combustion zone and ultimately spent shale ash is discharged from the bottom of the retort tower. The effluent gases and vapors of distillation are withdrawn from the retort tower adjacent the top of distillation zone and are subsequently fractionated in an oil quench tower and a water quench tower for the recovery of heavy, medium and light oils as well as residual gases which latter are in part utilized for controlling reactions in the combustion zone of the retort tower and in part stored for uses for other purposes.

Objects and features in connection with the invention are the utilization of part of the steam generated in the preheating and drying section for the recovery of heat from hot ash from the combustion zone of the retort tower, also utilization of part of this steam in temperature control of the combustion zone, and also utilization of part of this steam in the combustion zone to make producer gas by the water-gas reaction and to assist in the formation of NH₃ with the nitrogen in the shale ash.

Other objects and features of the invention are to so utilize the hot gaseous products of combustion rising from the combustion zone that they are divided into two portions, one portion passing upwardly through the distillation zone of the retort to provide the heat required for stripping oil from the shale in said zone and the other portion being withdrawn from the top of the combustion zone and being reintroduced after treatment to render it noncombustion supporting into the drying and preheating section of the retort tower to provide some of the heat required for water removal (drying) and for preheating the shale.

Other objects and features of the invention are the provision of a novel retort tower wherein one tower has combined therein a physically separated drying and preheating section and a combined distilling and combustion section, the sections being superimposed on each other in the order named.

Further objects and features of the invention are the provision of pressure controls for controlling pressures throughout the retort tower so as to have a minimum of undesired dilutions between sections, as well as the provision of novel structural details for the retort tower, including its baffling arrangement for distribution of gases and solids throughout the length of the retort and its shape.

Other objects and novel features will become apparent from the following specification and accompanying drawings forming a part hereof wherein:

Fig. 5 is a transverse horizontal section taken along line 5—5 of Fig. 2;

Fig. 6 is a perspective view of one of the gaseous product removal pipes;

Fig. 7 is a vertical section taken along line 7—7 of Fig. 5;

Fig. 8 is a transverse horizontal section taken along line 8—8 of Fig. 2;

Fig. 9 is a fragmentary vertical section taken along line 9—9 of Fig. 8, and

Fig. 10 is a fragmentary underside perspective view of the internal gas distribution header of Fig. 8.

*Shale oil retort*

Figure 1:
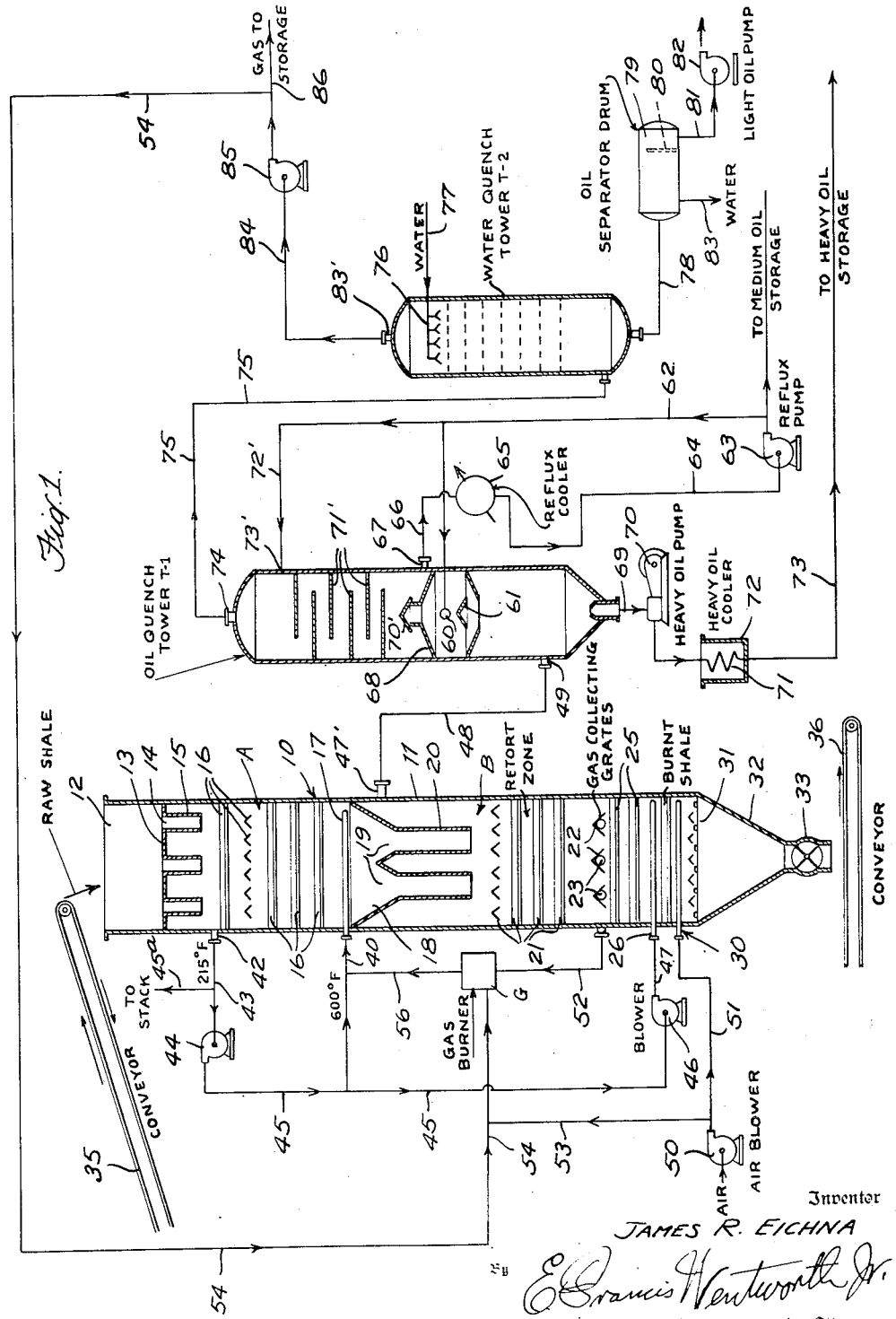
Fig. 1 is a schematic flow diagram of a shale oil retorting apparatus and oil recovery system embodying the invention.
Figure 2:
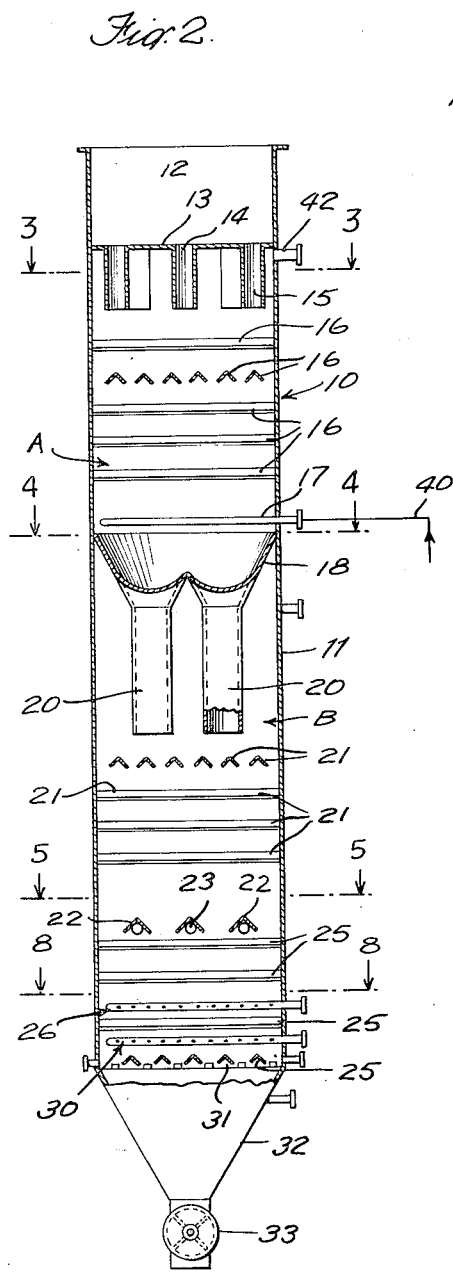
Fig. 2 is a longitudinal vertical section of a shale oil retort embodying features of the invention.
Figure 3:
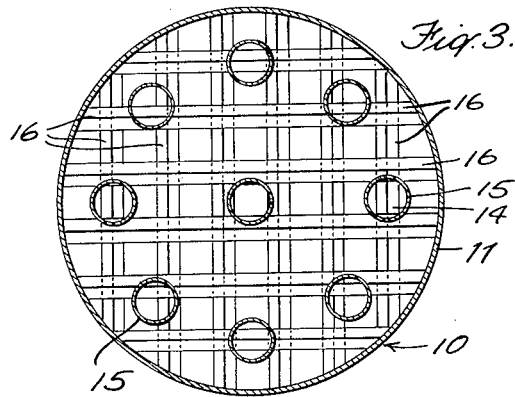
Fig. 3 is a transverse horizontal section taken along line 3—3 of Fig. 2.
Figure 4:
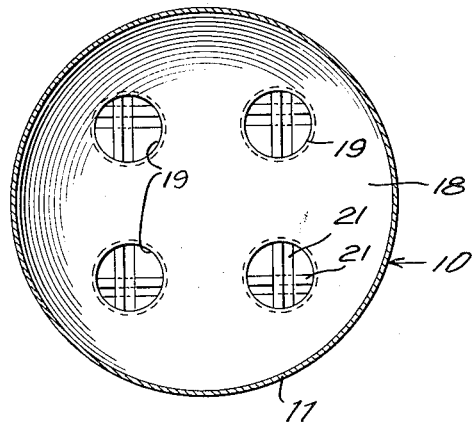
Fig. 4 is a transverse horizontal section taken along line 4—4 of Fig. 2.

Referring to the drawings, the shale oil retort 10 comprises a tubular tower 11 which is provided at its upper end with a reservoir feed hopper space 12 whose floor is defined by a transverse partition 13 having openings 14 and downwardly directed tubular chutes or seal legs 15 secured to the underface of the partition 13 and around the openings. Shale distributing grates are positioned in the tower 11 below the lower ends of tubes or seal legs 15 and in the embodiment shown comprise a plurality of horizontal rows of spaced apart transversely extending angle bars 16 positioned as inverted V's at different levels. The angle bars 16 of one or more of the rows extend at crossed direction relative to those of the other rows. In the embodiment shown, the second row of these bars 16 below tubes 15 is so disposed. One or more of the other rows may be similarly disposed, or so disposed in the alternative for the shown disposition of the said second row.

A gas distributor 17 is positioned below the lowermost row of grate bars 16. This distributor 17 has a construction hereinafter to be described. A transversely extending concave or hopper-shaped partition 18 is positioned in the tower 11 below the gas distributor 17. Thus partition 18 effectively divides the tower 11 into an upper section A which is to be considered as a drying or preheating section or zone of the tower and a lower section B which is subdivided as will be described into a distilling zone and a combustion zone.

Openings 19 in the partition 18 are connected to downwardly extending tubes or seal legs 20 so that the shale treated in zone A can fall therethrough into the section B and onto the distributing grates 21 therein which have substantially the same construction as grates 16 and consist, for example, of several horizontal rows of spaced apart, transversely extending angle bars 21 positioned as inverted V's at different levels with the angle bars 21 of one or more of the rows extending at crossed directions relative to those of the other rows.

A horizontal row of transversely extending spaced-apart angle bars 22 is positioned below the lowermost row of grate bars 21. The angle bars 22 are positioned as inverted V's. Pipes 23 extending in parallelism with bars 22 and centralized relative to the apices of the angles of these bars 22 lie directly below the latter and in fairly close proximity thereto. These pipes have a plurality of slots 24 in their upper surfaces so that gas collected in the pockets defined by the under surfaces of the angle bars 22 may be withdrawn through these slots 24 and pipes 23. The retorting or distilling zone of section B of the tower extends from just above angle bars 22 to the under surface of partition 18. The partition 18 and bars 22 define the upper and lower boundaries of the retorting or distilling zone of section B.

Redistributing grates 25 consisting of horizontal rows of transversely extending, spaced apart angle bars 25 positioned as inverted V's lie below the pipes 23. Intermediate a pair of the rows of redistributing grates 25, a gas distributor 26 is provided. This distributor as seen in plan in Fig. 8 consists of a header pipe 27 extending transversely of the tower 11 and provided with communicating lateral pipes 28 all arranged in a common horizontal plane. The under sides of the pipes 28 have slotted gas outlets 29. Pipe 27 extends outwardly of the tower 11. The gas distributor 17 in section A of the tower is of substantially identical construction as distributor 26. An air distributor 30 of the same construction as gas distributor 26 is positioned in similar manner in the tower between a pair of rows of grate bars 25 below the gas distributor 26.

The lowermost grate bars 25 are positioned adjacent a conventional discharge mechanism 31 communicating with the bottom 32 of the tower which is hopper-shaped and provided with a discharger nozzle or lock mechanism 33 of conventional type for discharging the contents at the bottom of the tower at will. The portion of the section B of the tower 11 between lowermost grates 25 and pipes 23 is the combustion zone of the retort. The upper boundary of this combustion zone is defined by grates 22 and the lower boundary is defined substantially by air distributor 30.

The shale oil retort 10 is periodically supplied with raw shale by a conveyor 35 which discharges into the hopper space 12 at the top of the retort. The discharger nozzle or lock mechanism 33 discharges spent or burnt shale refuse onto another conveyor 36 conveniently located below it.

Shale oil recovery process

The shale oil retort 10 hereinabove described is utilized in the recovery of shale oil and in carrying out the process. The retort 10 is utilized in conjunction with other apparatus including two additional towers of conventional construction, one of which is an oil scrubbing tower T–1, and the second of which is a water scrubbing tower T–2. These two towers are interconnected by conduits with the shale oil retort 10 so that effluent shale oil-containing gases from the latter may be fractionated and spent gases after fractionation recycled to the retort, and with other equipment as will be presently described.

Operation in the shale oil retort (a) *Drying and preheating section A.*—Raw shale is charged intermittently into the reservoir feed hopper space 12 at the top of tower 11 from conveyor 35, for example, approximately every four hours as the level in the hopper space 12 falls. Flow of shale from hopper space 12 downwardly through the retort 10 is continuous.

The shale solids in hopper space 12 pass downwardly through the tube or seal legs 15 into the drying section A by gravity. As the shale particles pass downward over the distributing grates 16 in the drying and preheating section they are dried and preheated by a stream of hot noncombustion supporting gases which are fed into the preheating section A at a temperature of approximately 600° F. substantially at its bottom through the gas distributor 17 which is supplied by a branch conduit 40 communicating with a conduit 56 connected to a gas burner G, which is supplied as will be described, and also communicating with recycle conduit 45. The noncombustion supporting gases delivered by distributor 17 pass upwardly through the shale mass from its bed in drying and preheating section or zone A. The spent gases reaching the top of section or zone A are withdrawn at a temperature of approximately 215° F. through the outlet 42 connected to a conduit 43 which leads to a recycling blower 44. A branch conduit 45a connected to conduit 43 delivers the excess part of the spent gases which consist essentially of a mixture of carbon dioxide, nitrogen and steam, withdrawn via conduit 43 to atmosphere via a stack (not shown). The portion of these withdrawn gases that are received by blower 44 from conduit 43 are recycled via the conduit 45, a recycle blower 46 and conduit 47 to the gas distributor 26 located in the combustion zone of the tower 11 for the purposes of controlling the combustion zone reactions and temperatures. Branch conduit 40 receives a part of the recycled gases from conduit 45.

To prevent spontaneous ignition of the oil shale, it is imperative that the heating gases entering the distributor 17 at the bottom of drying and preheating section A either be free of oxygen or otherwise be incapable of supporting combustion containing oxygen only in a noncombustible form, e. g., as $CO_2$ gas or as $H_2O$ in steam, and control of this requirement is described hereafter.

In its continuous downward passage through drying and preheating zone A, the shale reaches the bottom of its bed at partition 18 where it is essentially water free and is at approximately a temperature of 500° F. From partition 18 it pastes via seal legs or tubes 20 into the distillation or retorting zone of section B of the tower 11.

(b) *Action in distillation or retorting zone.*—The shale solids continuously pass downwardly through the distillation zone around distributing grates 21 while hot gaseous products of combustion rising from the combustion zone pass upward therethrough. The gaseous products of combustion coming from the combustion zone enter the distilling or retorting zone at approximately temperatures of 1100°–1300° F., and provide necessary heat for distilling or stripping the oil out of the shale. In their upward passage through the distilling zone these gaseous products of combustion heat the shale solids moving downwardly in the said zone to approximately 1000° F. which is sufficient to strip them completely of their oil content. The gases and oil vapors then are withdrawn as an effluent product at the top of the distilling or retorting zone via a duct outlet 47' connected by a conduit 48 to an inlet duct 49 of the first of the fractionating devices, namely, an oil quench tower T–1.

(c) *Action in combustion zone.*—The oil freed shale moves downwardly from the bottom of the distillation or retorting zone over the gas collecting grates 22, the distributing grates 25, the combustion zone gas distributor 26 and the air distributor 30 which latter is positioned substantially at the bottom of the combustion zone. The air from distributor 30 is utilized to effect the burning of the residual carbon in the spent shale passing downward into the combustion zone from the distillation zone. It is necessary to dilute this air with inert gases which are recycled from the drying and preheating section A of the tower 11 and gas burner G and introduced as inert gas via gas distributor 26 in order to control the temperatures throughout the combustion zone and prevent a temperature rise therein above the fusing temperature of the spent shale and shale ash. At temperatures of about 2000° F. the shale ash usually begin to fuse. This would result in clinker formation in the combustion zone and compel shut down of the retort. To prevent such a possibility the temperature in the combustion zone must be maintained several hundred degrees below the ash fusion point and this is accomplished by the proper admixture of inert gas admitted through gas distributor 26 and the air admitted through distributor 30. Temperature control is also necessary to prevent exceeding allowable temperature limits of conventional materials of construction. The temperature at any point in the combustion zone should thereby be controlled for limitation to a maximum of 1600° F.

The hot gaseous products of combustion of the combustion zone will be in excess of the amount required to effect the retorting of the shale in the distillation zone. Thus at the top of the combustion zone adjacent the gas collecting grates 22 a portion of the gaseous products of combustion are drawn off through the pipes 23 and fed via conduit 52 to the gas burner G. The remainder of the gaseous products of combustion not so tapped off through pipes 23 and in the amount required for the distillation of the shale in the distillation zone passes upwardly around grates 22 for action on the shale in the distillation zone as described above.

Since some of the resultant gases of the combustion reactions occurring in the combustion zone include hydrogen (H₂) and carbon monoxide (CO) gases, the latter as they arrive at the top of the combustion zone contain additional heat which may be recovered by burning them. Hence the portions thereof drawn off via pipes 23 and through conduit 52 are admixed in the gas burner G with air directed from conduit 51 via a branch conduit 53 connected thereto and to the gas burner. The gases arriving at burner G via conduit 52 are at approximately 1300° F. The combustion in gas burner G with admixed air from conduit 53 and also with gas subsequently derived from the water quench tower T-2 and delivered via a conduit 54, is regulated carefully to provide a noncombustion supporting gaseous product which is delivered from gas burner G via a conduit 56 to the branch conduit 40 for introduction into the preheating and drying section A via gas distributor 17 at approximately a temperature of 600° F. Excess of the noncombustion supporting gaseous product of burner G is delivered via conduit 56 to the branch conduit 40 for flow into gas distributor 17 with gases being passed thereto through conduits 45 and 40.

Approximately 90% of the carbon of the spent shale is burned off as it passed downwardly through the combustion zone of tower 11. In its passage it is cooled by the inert gas, steam and air introduced via distributors 26 and 30. Thus a recovery of a large portion of the reusable heat available in the hot ash is effected.

At the bottom of the combustion zone the ash is removed by the discharge device 31 and falls into the portion 32 for discharge via the lock mechanism 33 onto the conveyor 36. These devices 31 and 33 are the only movable parts in the retort and as they operate in a region of the retort tower 11 that is cool they are not subject to corrosion since the surrounding atmosphere in their vicinity is air at usual atmospheric temperatures.

*Operation of the recovery facilities*

The effluent gases containing in vapor form the recoverable oil from the shale which passes from the top of the distillation zone of the tower 11 via duct 47′ and conduit 48 first enters the first fractionating or oil quench tower T-1 wherein heavy and medium oils are separated and the residue or residual vapors of the oil quench tower T-1 pass to the second fractionating or water quench tower T-2. The effluent gases from retort 10 at approximately 600° F. are delivered via conduit 48 to the lower zone of oil quench tower T-1 wherein partial condensation occurs as a result of natural cooling as well as reflux flow of cooled medium oil introduced into the tower T-1 at 60 above a baffle 61 via a conduit 62 from a circulating reflux pump 63 which in turn is connected via conduit 64 to a circulating reflux cooler 65 which in turn is connected by a conduit 66 to a drain outlet 67 of the tower T-1 arranged adjacent a sump 68 in the tower T-1. The cooling action on the effluent gases entering tower T-1 from duct 49, condenses the heavy oil in these gases which together with fine particles of shale dust fall to the bottom of the tower T-1. This condensate and dust is withdrawn via a conduit 69, a heavy oil pump 70 and pumped through a coil 71 in a box cooler 72. The heavy oil from coil 71 then passes via conduit 73 to a heavy oil storage tank (not shown). The solids in this heavy oil settle out in the said storage tank. If desired, a Dorr thickener or equivalent device can be introduced in storage conduit 73 for separation of the solids in the heavy oil before the latter reaches storage.

The uncondensed vapors in tower T-1 pass upwardly around the baffles 61, 70′ and 71′ to the upper portion of the tower where they are successively washed down by cooled reflux medium oil delivered via conduits 62 and 72′ to inlets 60 and 73′ respectively. This cool reflux oil acts to condense out medium oil from the vapors which medium oil together with the wash medium oil is trapped by the sump or trap-out pan 68 whence they pass out via duct 67, conduit 66 to circulating reflux cooler 65 and thence via conduit 64 to reflux pump 63 whence part of the cooled medium oil is recirculated via conduit 62 and the balance passed to tankage or storage as medium oil product.

Uncondensed residual vapors as residue pass out of the top outlet 74 of the tower T-1 and are directed by conduit 75 to the inlet at the bottom of the water quench tower T-2. In tower T-2 these residual vapors are cooled and light oil is condensed out by a spray of cold water introduced adjacent the top of tower T-2 through spray heads 76 to which cold water is pumped via a conduit 77.

The condensed light oil and water in the tower T-2 accumulate at its bottom whence they are drawn off via a conduit 78 to an accumulator or separator tank or drum 79 where gravity separation of the oil from the water is accomplished. The separated light oil, which floats in the water in drum 79, overflows a baffle 80, and via conduit 81 and pump 82 is pumped to storage. The water is drawn off via conduit 83 and may either be recirculated to conduit 77 or discharged as waste.

The residual uncondensed gases reaching the tower of water quench tower T-2 are essentially free of liquid hydrocarbons. This residue of gases is drawn off via outlet 83′ and conduit 84 by a blower 85 which acts to maintain required pressure throughout the system. A portion of this gaseous residue is pumped via conduit 54 to the gas burner G for reentry into the retorting tower 11 as previously described. The remainder or net product of the gaseous residue is passed to storage via conduit 86 for use for power generation, or as fuel for the refinery or for by-product processing operations.

If additional recovery of additional liquid products is desired to obtain maximum recovery of liquid products, a third tower (not shown) comprising a conventional absorber using a light absorption oil can be connected to receive the effluent residual gases from the water quench tower T-2.

While a specific embodiment of the invention has been described, variations in structure within the scope of the claims are possible and are contemplated. There is no contention, therefore, of limitation to the exact details shown and described.

What is claimed is:

1. In apparatus for the recovery of oil from shale, a retorting tower having a hopper space at its top into which raw shale is introduced periodically, a partition at the bottom of the hopper space having openings, seal legs connected with said opening and in communication with the tower space below said partition and through which raw shale may move downwardly continuously from the hopper space, shale distributing grates positioned at different levels below said partition, a gas distributor below said grates, a hopper-like partition extending transversely of said tower below the gas distributor and with the first-named partition defining a preheating and drying section in said tower, said hopper-like partition having openings, seal legs connected with said openings and providing passage for downward movement of shale from the preheating and drying section, shale distributing grates positioned at different levels below said last-named seal legs, gas collecting grates below the last-named distributing grates, said gas collecting grates defining the lower boundary of a retorting zone in said tower whose upper boundary is the hopper-like partition, gas withdrawal pipes positioned below the gas collecting grates, shale distributing grates at different levels below said pipes, gas distributing means positioned between various of the last-named grates, air introducing means below the gas distributing means and defining the lower boundary of a combustion zone whose upper boundary lies substantially at the level of said pipes, burnt shale discharge means below said air introducing means, means for withdrawing effluent gases from the tower adjacent the upper boundary of the retorting zone, means for withdrawing spent gases from the drying and preheating section, means for withdrawing gaseous products of combustion through said pipes and means for recycling both spent gases withdrawn from the preheating and drying section and gaseous products of combustion withdrawn through said pipes to the combustion zone.

2. The apparatus of claim 1 wherein the distributing grates comprise angle bars positioned as inverted V's in said tower.

3. The apparatus of claim 1 wherein the gas collecting grates comprise angle bars positioned as inverted V's and wherein the gas withdrawal pipes are in centralized positions below the apices of said last-named angle bars and in close proximity thereto, said pipes having passageways in their upper faces.

4. The apparatus of claim 1 wherein the gas distributor comprises a header having lateral branch pipes communicating therewith and wherein the branch pipes have outlet passageways in their under faces.

5. In apparatus for the recovery of oil from shale, a retorting tower through which shale introduced at the top thereof is adapted to move downwardly continuously through the tower for stripping of oil from the shale, said tower comprising partition means dividing it into two separate superposed sections, said partition being so constructed and arranged as to permit shale to pass from the uppermost section into the lower section and to prevent gases from the lowermost section from flowing into said uppermost section, said uppermost section constituting a preheating and drying section and the lowermost section constituting a combined retorting zone and combustion zone, shale-distributing grates positioned at different levels above said partition means, a gas distributor below said grates and above said partition means, gas conduit means through which noncombustible preheating and drying gases are conducted to said distributor, shale-distributing grates positioned at different levels below said partition, gas-collecting grates below the last-named distributing grates, said gas-collecting grates defining the lower boundary of a retorting zone in the tower whose upper boundary is said partition means, gas withdrawal pipes positioned below the gas-collecting grates, collected gas-conducting means for conducting collected gas outwardly of the tower, shale-distributing grates at different levels below said pipes, other gas-distributing means positioned at a level between various of the last-named grates, air-introducing means below the other gas-distributing means and defining the lower boundary of a combustion zone whose upper boundary lies substantially at the level of said pipes, burnt shale discharge means below said air-introducing means, means for withdrawing effluent gases from the tower adjacent the upper boundary of the retorting zone, means for withdrawing spent gases from the drying and preheating section, means for conducting withdrawn spent gases to said other gas-distributing means, control means for controlling the quantity of spent gases conducted to said other gas-distributing means, and means for controlling the quantity of air conducted into said air-introducing means.

6. In apparatus for the recovery of oil from shale, a retorting tower through which shale introduced at the top thereof is adapted to move downwardly continuously through the tower for stripping of oil from the shale, said tower comprising partition means dividing it into two separate superposed sections, said partition being so constructed and arranged as to permit shale to pass from the uppermost section into the lower section and to prevent gases from the lowermost section from flowing into said uppermost section, said uppermost section constituting a preheating and drying section and the lowermost section constituting a combined retorting zone and combustion zone, shale-distributing grates positioned at different levels above said partition means, a gas distributor below said grates and above said partition means, gas conduit means through which noncombustible preheating and drying gases are conducted to said distributor, shale-distributing grates positioned at different levels below said partition, gas-collecting grates below the last-named distributing grates, said gas-collecting grates defining the lower boundary of a retorting zone in the tower whose upper boundary is said partition means, gas withdrawal pipes positioned below the gas-collecting grates, a gas burner, collected gas-conducting means for conducting collected gas from said pipes to the burner, noncombustible gas-conducting means communicating with said burner and with said first-mentioned gas distributor through said gas conduit means so as to conduct noncombustible gases from the burner to said distributor, shale-distributing grates at different levels below said pipes, other gas-distributing means positioned at a level between various of the last-named grates, air-introducing means below the other gas-distributing means and defining the lower boundary of a combustion zone whose upper boundary lies substantially at the level of said pipes, burnt shale discharge means below said air-introducing means, means for withdrawing effluent gases from the tower adjacent the upper boundary of the retorting zone, means for withdrawing spent gases from the drying and preheating section, means for conducting withdrawn spent gases to said other gas-distributing means, control means for controlling the quantity of spent gases conducted to said other gas-distributing means, and means for controlling the quantity of air conducted into said air-introducing means.

7. In apparatus for the recovery of oil from shale, a retorting tower through which shale introduced at the top thereof is adapted to move downwardly continuously through the tower for stripping of oil from the shale, said tower comprising partition means dividing it into two separate superposed sections, said partition being so constructed and arranged as to permit shale to pass from the uppermost section into the lower section and to prevent gases from the lowermost section from flowing into said uppermost section, said uppermost section constituting a preheating and drying section and the lowermost section constituting a combined retorting zone and combustion zone, shale-distributing grates positioned at different levels above said partition means, a gas distributor below said grates and above said partition means, gas conduit means through which noncombustible preheating and drying gases are conducted to said distributor, shale-distributing grates positioned at different levels below said partition, gas-collecting grates below the last-named distributing grates, said gas-collecting grates defining the lower boundary of a retorting zone in the tower whose upper boundary is said partition means, gas withdrawal pipes positioned below the gas-collecting grates, a gas burner, collected gas-conducting means for conducting collected gas from said pipes to the burner, noncombustible gas-conducting means communicating with said burner and with said first-mentioned gas distributor through said gas conduit means so as to conduct noncombustible gases from the burner to said distributor, shale-distributing grates at different levels below said pipes, other gas-distributing means positioned at a level between various of the last-named grates, air-introducing means below the other gas-distributing means and defining the lower boundary of a combustion zone whose upper boundary lies substantially at the level of said pipes, burnt shale discharge means below said air-introducing means, means for withdrawing effluent gases from the tower adjacent the upper boundary of the retorting zone, means for withdrawing spent gases from the drying and preheating section, means for conducting a portion of the withdrawn spent gases to said first-mentioned gas-distributing means through said gas conduit means and another portion of said withdrawn spent gases to said other gas-distributing means, control means for controlling the quantity of spent gases conducted to said gas-distributing means and said other gas-distributing means, and means for controlling the quantity of air conducted into said air-introducing means.

8. In apparatus for the recovery of oil from shale a retorting tower through which shale introduced at the top thereof moves downwardly continuously through the tower for stripping of oil from the shale, said tower comprising means dividing it into two separate superposed sections, the uppermost of which constitutes a preheating and drying section and the lowermost of which constitutes a combined retorting section and combustion section, the latter section being at a lower level than the retorting section, means for introducing noncombustion supporting heating gas into the preheating and drying section at the lower portion thereof for upward flow through shale passing downwardly therethrough, means for introducing air to support combustion of oil-stripped shale into the combustion section, control means for controlling the quantity of air introduced into said combustion section, recycle gas conducting means directly connecting the drying and preheating section and the combustion section so that spent gases flow directly from said drying and preheating section to the combustion section, said recycle gas conducting means communicating at one end thereof with the upper portion of the drying and preheating section so as to receive spent gases therefrom and communicating at the opposite end thereof with the combustion section adjacent the air introducing means, other control means for controlling the quantity of gases recycled through said recycle gas conducting means into said combustion section to control the temperatures throughout the combustion section and prevent a temperature rise therein above the fusing temperature of the spent shale and shale ash, means for controlling the quantity of gaseous products of combustion moving upwardly from the combustion section into the retorting section to that amount requisite to strip the oil from the shale moving downwardly in the retorting section, a gas withdrawal conduit, a gas burner, said gas withdrawal conduit communicating with the combustion section so as to receive excess gaseous products of combustion therefrom and communicating with said burner so as to conduct said excess gaseous products thereto, and noncombustion supporting gaseous product conduit means in communication with said burner means so as to receive noncombustion-supporting gaseous products from the burner and communicating with the preheating and drying section to conduct said noncombustion-supporting gases thereto, means for withdrawing oil stripped from the shale in the retorting section as an effluent gas for subsequent fractionation, and means for withdrawing shale ash from the bottom of the tower.

References Cited in the file of this patent

UNITED STATES PATENTS

| 1,066,717 | Doherty | July 8, 1913 |
| 1,551,956 | Hubmann | Sept. 1, 1925 |
| 1,690,935 | Hubmann | Nov. 6, 1928 |
| 1,922,321 | Parker | Aug. 15, 1933 |
| 2,289,917 | Lambiotte | July 14, 1942 |
| 2,557,680 | Odell | June 19, 1951 |

FOREIGN PATENTS

| 107,907 | Australia | July 5, 1939 |

OTHER REFERENCES

U. S. Bureau of Mines Information Circular 7348, May 1946, pages 31–58.

Payne et al.: "Oil Shale Retorting," National Petroleum News, vol. 38, No. 1, January 2, 1946, pages R–36 to R–39.